(12) United States Patent
Wulff et al.

(10) Patent No.: US 7,158,374 B2
(45) Date of Patent: *Jan. 2, 2007

(54) METHOD AND SYSTEM FOR ASSEMBLING KEYPAD

(75) Inventors: Thomas Wulff, North Patchogue, NY (US); David E. Bellows, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 10/990,107

(22) Filed: Nov. 15, 2004

(65) Prior Publication Data

US 2005/0068201 A1 Mar. 31, 2005

Related U.S. Application Data

(63) Continuation of application No. 10/127,051, filed on Apr. 18, 2002, now Pat. No. 6,822,853.

(51) Int. Cl.
*G06F 1/16* (2006.01)

(52) U.S. Cl. ............... 361/680; 361/679; 341/22; 341/27; 235/145 R; 400/472

(58) Field of Classification Search .......... 361/680; 341/22, 27, 33, 34; 235/145 R, 146, 145 A; 400/472–473, 490, 496, 688

See application file for complete search history.

(56) References Cited

U.S. PATENT DOCUMENTS 6,495,784 B1* 12/2002 Yoon et al. ............... 200/517
2001/0041088 A1* 11/2001 Lebeau et al. ............ 400/691

* cited by examiner

*Primary Examiner*—Yean-Hsi Chang
(74) *Attorney, Agent, or Firm*—Amin, Turocy, & Calvin, LLP

(57) ABSTRACT

A method and system for assembling a keypad or a keypad module to a processing portion of an electronic device is described. The keypad module is a sealed unit connectable to the pre assembled processing portion through a common interface. The keypad module includes a bezel substrate that has a locally thin region where an accessory can be placed. For example, a speaker may be included in the keypad module. The keypad module itself may be its own an electromechanical entity.

14 Claims, 7 Drawing Sheets

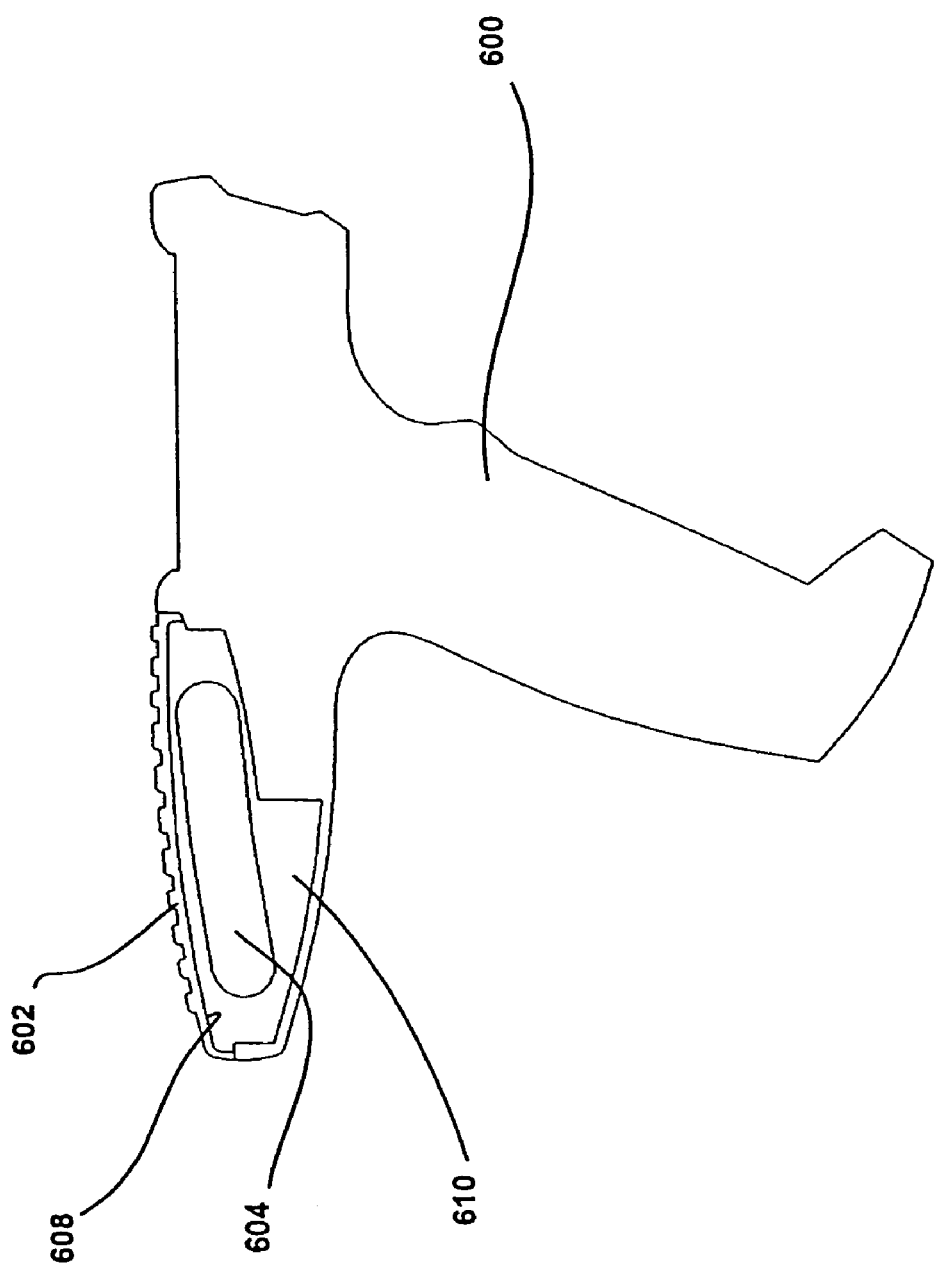

METHOD AND SYSTEM FOR ASSEMBLING KEYPAD

REFERENCE TO RELATED APPLICATIONS

This application is a continuation of U.S. Pat. No. 6,822,853 issued on Nov. 23, 2004 based on U.S. patent application Ser. No. 10/127,051, filed Apr. 18, 2002, entitled, "METHOD AND SYSTEM FOR ASSEMBLING KEYPAD."The entirety of this application is incorporated herein by reference.

FIELD OF THE INVENTION

The present invention relates to methods and systems for mounting keyboards to electronic devices, and in particular to modular integrated keyboards with accessories. The present invention also relates to keypad assemble design itself.

BACKGROUND INFORMATION

Many conventional electronic devices include a keyboard or keypad that allows a user to control the device and to enter data. Although these devices may have disparate uses, they all require a convenient mean for the user to enter data. In the case of mobile devices, small size and weight also have to be achieved. The keyboards used for these devices can be of different size and configuration, with different number of keys, layout of the keys, and different nomenclature. The same product may be produced with different keyboards, depending on the user's preferences.

Typically the keyboard is assembled during construction of the device and is an integral part of the device, so that the type of keyboard to be used must be selected before the device is completed. This requires extensive product planning to be carried out, so that the desired combinations of devices and keyboards are produced. This operation is also work intensive, since the various mechanical and electronic components of the keyboard must be assembled with the device as the device itself is constructed.

Many devices are designed to be portable, thus the weight and size added by their keyboard can make the devices impractical. In particular, additional accessory components such as speakers are often added to the keyboard, that further increase the size and weight contribution of the keyboard. Small speakers are typically used to minimize the increase in size, but these result in very poor sound quality.

SUMMARY OF THE INVENTION

Embodiments of the present invention include a keypad assembly that includes a bezel substrate, a plurality of keys independently movable relative the bezel substrate, and an electronics circuit layer between the bezel substrate and the keys. A locally thinned portion of the bezel substrate may be provided, that is adapted to receive an accessory of the keypad assembly connected to the electronic circuit.

In another aspect, the present invention is a method of manufacturing an electronic device. The method includes assembling a processing portion of the device, assembling a plurality of keypad modules having different configurations, selecting a desired one of the plurality of keypad modules, and attaching the desired assembled keypad module to the assembled processing portion via a common interface.

BRIEF DESCRIPTION OF THE DRAWING

FIG. 7 is a side elevation view of the embodiment of the keypad module shown in FIG. 6.

DETAILED DESCRIPTION

Figure 1:
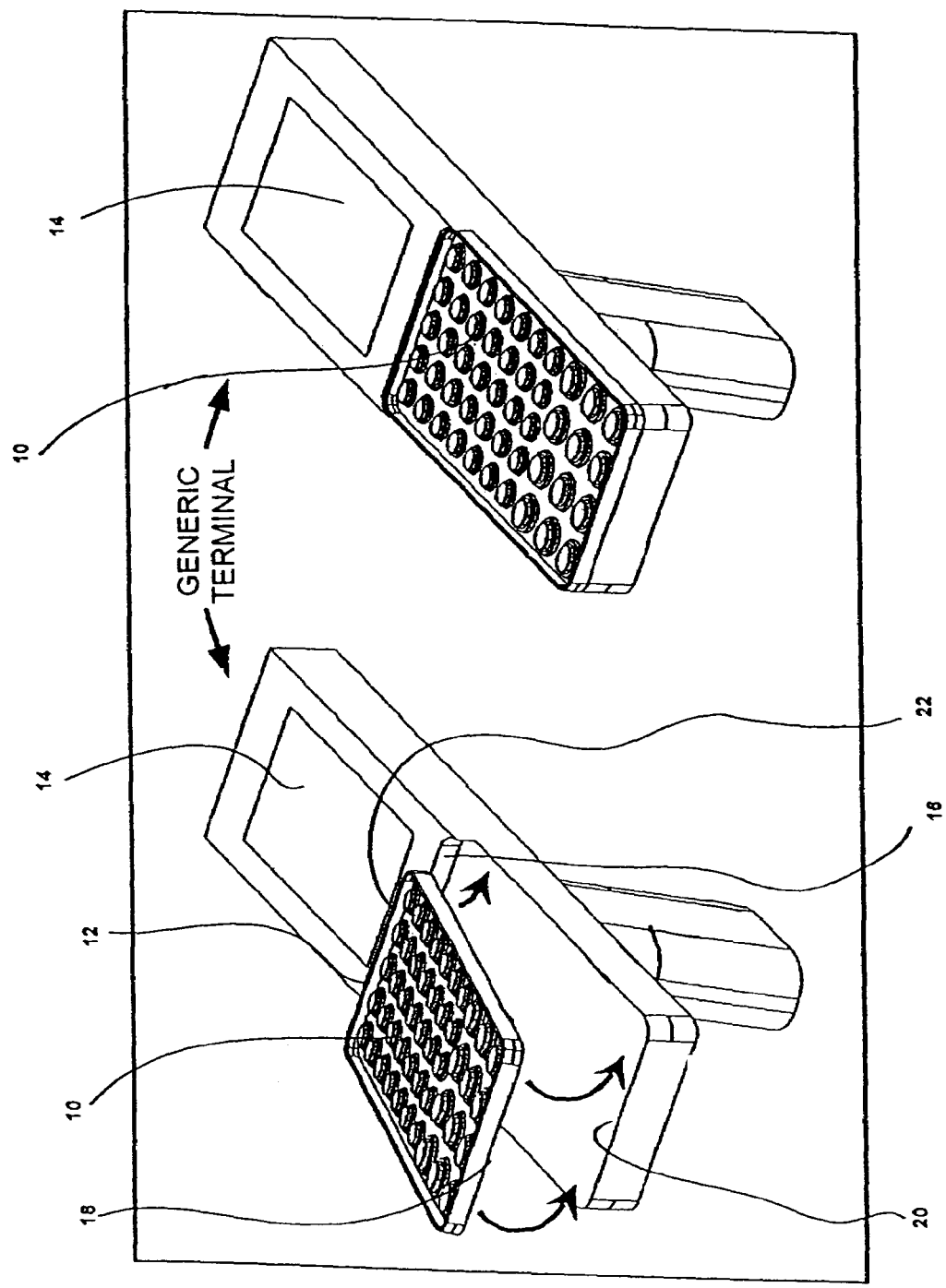
FIG. 1 is a perspective view of a keypad module according to one embodiment of the present invention, showing the assembly on an exemplary device.

The electro-mechanical keypad (e.g., modular keypad) according to embodiments of the present invention includes technologies which equate to overall improvements in product size, weight, cost, manufacturability, servicing and performance. For example, some of these benefits are obtained by constructing the keyboard separately from the product for which it is destined, and then attaching the desired keyboard to the product. As shown in FIG. 1, a keypad module 10 is a self contained, sealed electro-mechanical assembly, that snaps to a pre-assembled product 14. For example, the keypad module 10 may include a common interface connection 12 that can be connected to a matching common interface 16 of the product 14. Different keypad modules may be connected using the common interface 12, so that the product 14 may easily be assembled with a variety of keypad configurations.

Various mechanical devices may be used to retain the keypad module 10 in position on the product 14. For example, a tab 22 may retain one end of the keypad module 10, while friction tabs on surfaces 18, 20 secure the other end of the keypad module 10. Other conventional methods of securing the keypad module 10 to a predefined portion of the product 14 may also be used, without departing from the scope of the present invention. The product 14 may be one of a variety of devices, such as mobile computing devices, scanners, telephones, and other data entry electronic devices that require user inputs. The interface connection 12, according to the present invention, permits the use of the same keypad module 10 with different devices, so that fewer different parts have to be manufactured.

The common interface connection according to the present invention provides the ability to build products according to sales orders that have been already received. Since the desired keyboard or keypad may be connected to the appropriate device on the final assembly line, it is not necessary to rely on sales forecasts, which are often inaccurate, to project the number of products with specific keypad configurations that have to be built. There is thus no need to re-build any devices in the inventory to a different configuration that matches the current sales order, in case the forecasts prove to be inaccurate. The electro-mechanical keypad module 10 according to the present invention is a complete, independent unit. The device to which the keypad module 10 is attached can be assembled independently of any specific sales orders, and may be completed except for lacking the keyboard. When a specific sales order is received specifying a requested keypad configuration, the product may be completed by snapping or assembling in place on the product the appropriate keypad.

The interface connection 12 of keypad module 10 may also contain an identification element of the keypad, which may be an electronic identification element. When the keypad module 10 is connected to the product 14, software loaded in the processing unit of the product may recognize the configuration of keypad module 10, and may load the appropriate software for that configuration. Product 14 may thus be configured to carry out different functions simply by changing the modular keypad attached to it. This confers great flexibility to the user, since a single base device may be used to carry out different functions. For example, 4 or 5 software emulations may be available in one product 14, each configuration being accessible by connecting to the device a different keypad module 10 appropriate to the application. The identification element may be part of the interface connection 12, or may be part of the keypad module's circuitry, connected to the interface connection 12.

The keypad module 10 also confers benefits to the product 14 after manufacturing and assembly are complete. For example, service and warranty repairs are simplified, because damaged keyboards can be replaced without disassembling and then reassembling the entire device. As upgraded keyboards become available, it may also be possible to retrofit older products with the new keyboards, without any disassembly. The keypad modules and products according to exemplary embodiments of the present invention provide great marketing flexibility. Customers may be offered many variations of the keypad configuration in terms of geometry, layout, graphics and keypad size, without affecting the construction of the base product, which remains identical in all cases. For example, keypads with 21, 35 or 46 keys may be provided. The cost of the base product can thus remain low, and inventories do not have to be expanded.

Figure 2:
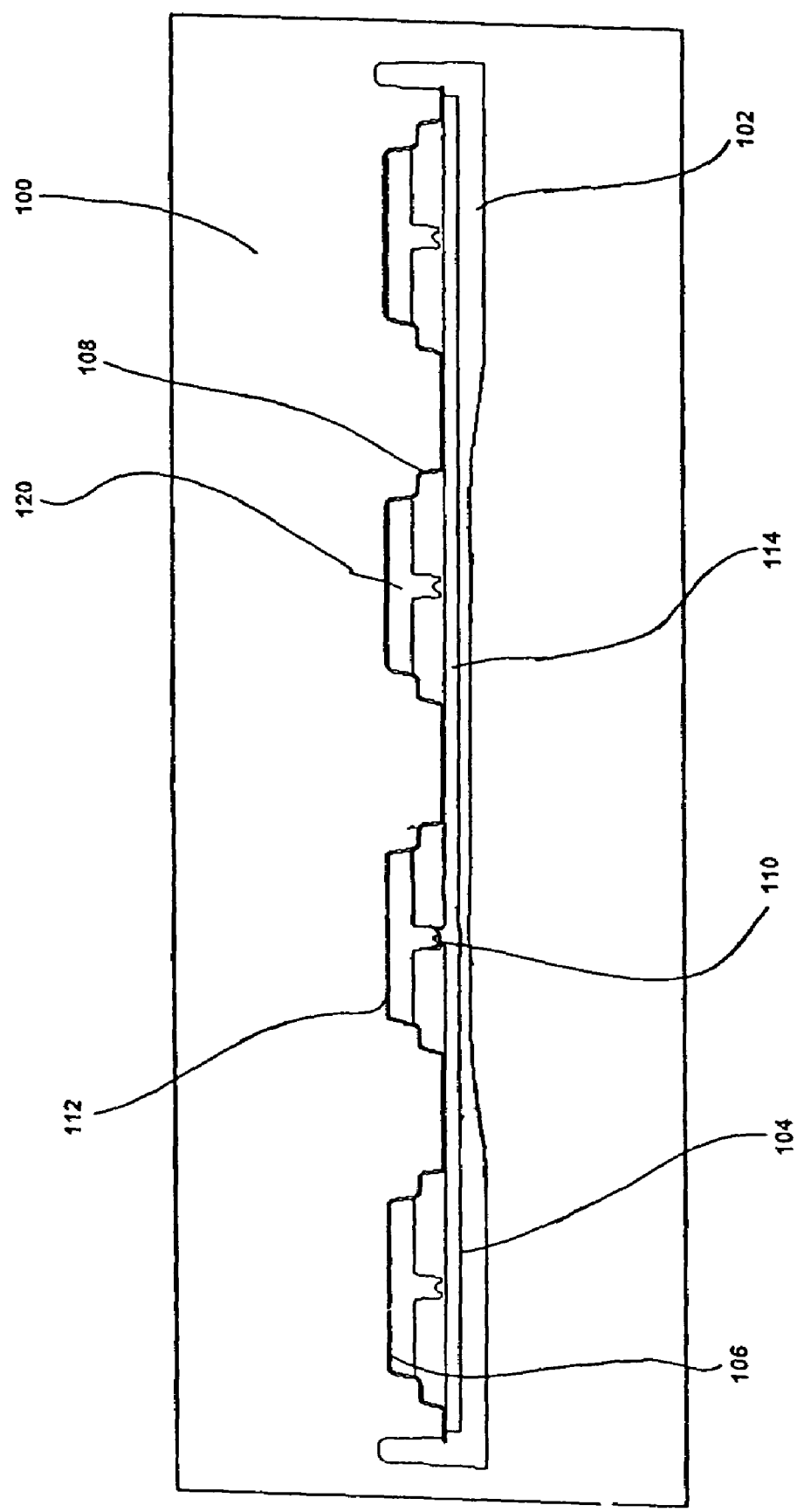
FIG. 2 is a cross sectional view of a keypad module according to the present invention.

Exemplary embodiments of the keypad module according to the present invention will be described with reference to the drawings. FIG. 2 shows a first embodiment of a keypad module 100 that can be used interchangeably with any device having the proper interface. A bezel substrate 102 may be used to form the structural backing for the keypad module 100. For example, the bezel substrate 102 may be made of a rigid polymer, and may define the overall shape and size of the keypad. Multiple keys 120 are mounted on the bezel substrate 102, to form an integrated assembly. Between the bezel substrate 102 and the keys 120, an electronic circuit layer 104 is situated. The layer 104 includes the electronic components necessary for the functioning of the keyboard. For example, conductive electrical traces may be formed on the layer 104, forming a printed circuit board, as necessary to form contacts for activation of the various keys. Other circuit traces may be provided for annunciator lights, speakers, or any other accessory attached to the keyboard. In the exemplary embodiment shown in FIG. 2, the layer 104 may be made of a flexible material.

A thin film 112 may be located on top of the keys 120, and may cover the top and sides of the keys 120, as well as the surfaces between adjacent keys. The thin film 112 may be transparent, and may have on its bottom surface graphics identifying the keys, or any other necessary information. Since the graphics are on the surface adjacent the key, not on the surface touched by the user, they do not fade or wear out as conventional graphics can. The thin film 112 may be selected to allow movement of the keys 120 when they are pressed. For example, the thin film 112 may be sufficiently flexible to form an unsupported web portion 108 around the perimeter of the keys 120. When one of the keys 120 is pressed, the web portion 108 flexes to allow the key to travel and close the circuit on the layer 104. In one exemplary embodiment, the thin film 112 may have sufficient stiffness to restore the keys 120 to the un-depressed position, once the pressure on the key is removed. In this embodiment, the bezel 102 and the keys 120 may be integrated into a single device.

The mechanical properties of the thin film 112 may be selected to give to the modular keypad the appropriate feel when the keys are pressed, since thin film 112 provides the restoring force that opposes movement of the keys. Every time a key is depressed, the portion of thin film 112 surrounding the key is deflected, which may cause mechanical fatigue in the long run. Thin film 112 may thus be selected to provide the proper service life of the keyboard, by having mechanical properties appropriate to the desired service life. Thin film 112 may be attached to the periphery of keypad module 100, for example to the edges of substrate 102. In this manner, thin film 112 encloses all of keys 120 in a sealed enclosure with substrate 102, such that a continuous protective surface overlies the keys 120 of keypad module 100. For example, thin film 112 may be made of an impermeable material.

A key substrate 106 may define the bottom surface of each of the keys 120. A post or actuator 110 may be incorporated on the base of each of the keys 120, for example extending from the key substrate 106. When the key is depressed and travels towards the layer 104, the actuator 110 closes the circuit, for example by pressing on metal snap domes, metallized polydomes, switches, conductive coatings, or other conventional switch mechanisms. The length of the actuator 110 may be selected to limit the maximum travel of the keys 120, such that the key's movement stops when the bottom of the actuator 110 contacts the layer 104. In a different embodiment according to the present invention, a resilient member such as a spring may be included between the layer 104 and the key substrate 106, to bias the keys in the non-depressed position.

In the exemplary embodiment shown in FIG. 2, the bezel substrate 102 includes a locally thinned region 114 designed to receive a speaker (not shown) or another accessory of the keyboard. The locally thinned region 114 is located so that it does not compromise the structural integrity of the keypad module 100, and provides mounting points for the keyboard accessory. In one exemplary embodiment, piezoelectric elements or conventional acoustical elements may be embedded in the layer 104 at the locally thinned region 114. Electrical input signals are converted to mechanical vibrations by the speaker, and resonate the thin walled housing of the keypad module 100, creating the desired sounds.

The keys 120 and the bezel substrate 102 shown in FIG. 2 are integrated into one component by utilizing, for example, an insertion molding process. According to the present invention, the keypad module is sealed from water, dust and other contaminants, and the design largely solves the problem of misaligned or sticking keys of the keypad module. The exemplary keypad module gives significant savings in size and weight to the complete device, and achieves cost savings by simplifying tooling to manufacture the devices and eliminates the need for overlays and for hard coatings of the keys.

Typically, a trade off is required between the size of the speakers used in the product and the frontal area of the product. Conventional products are designed with a dedicated frontal area used to place a speaker. The footprint of the product thus is increased to accommodate a speaker capable of producing sound of an acceptable quality, since improved acoustic performance is achieved by utilizing a larger speaker. If a small size is desired of a conventional product, a small speaker must be selected, resulting in inferior sound quality. According to the present invention, the keypad assembly includes an integrated speaker that is incorporated as part of the electronic package of such keypad. Since the electronic controls and the speaker itself are located below the keys of the keypad module, the speaker does not require a dedicated product frontal area, and a large speaker producing improved acoustics may be selected, without increasing the size of the product.

Figure 3:
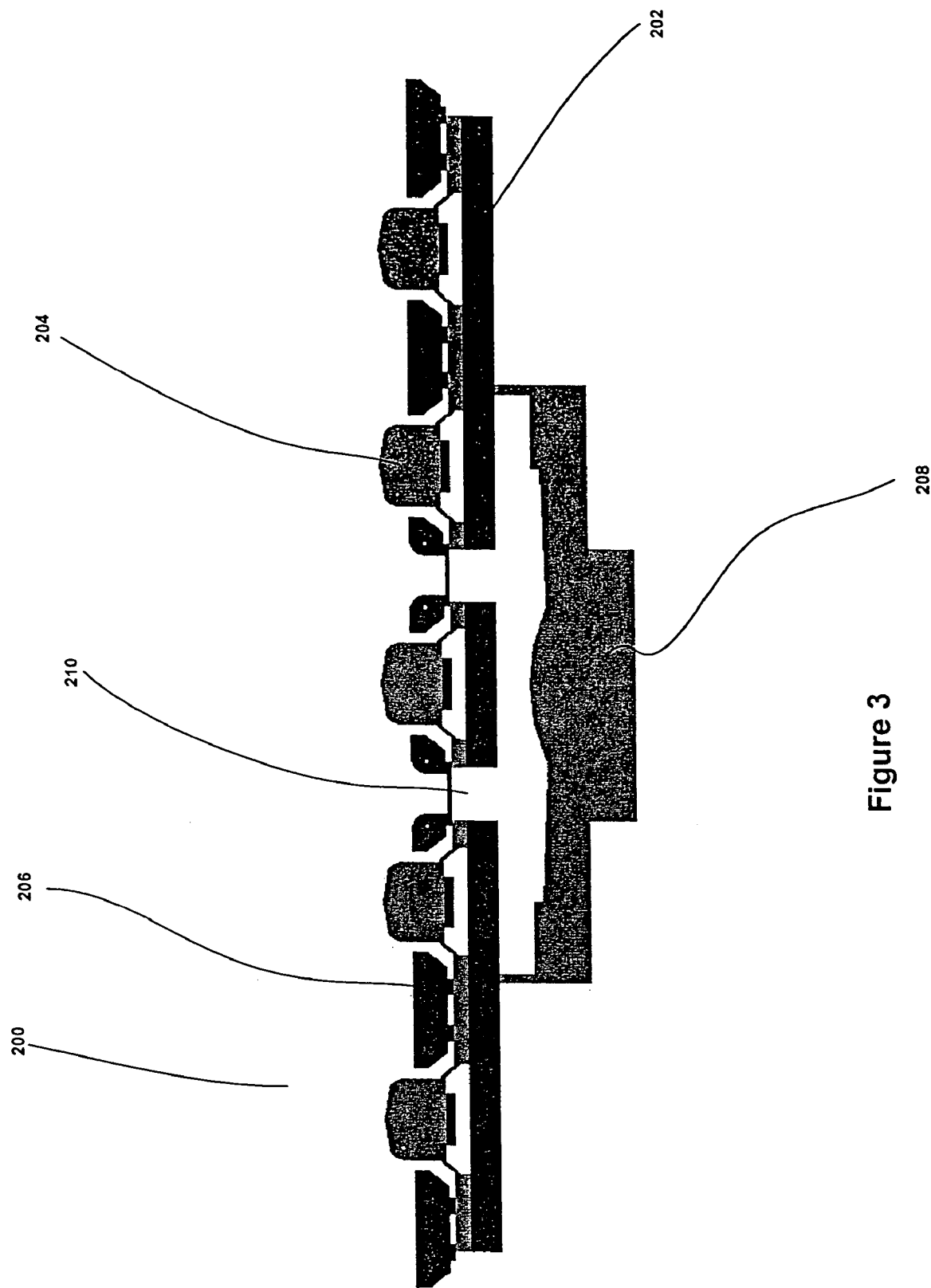
FIG. 3 is a cross sectional view of a second embodiment of a keypad module according to the present invention, incorporating a speaker.
Figure 4:
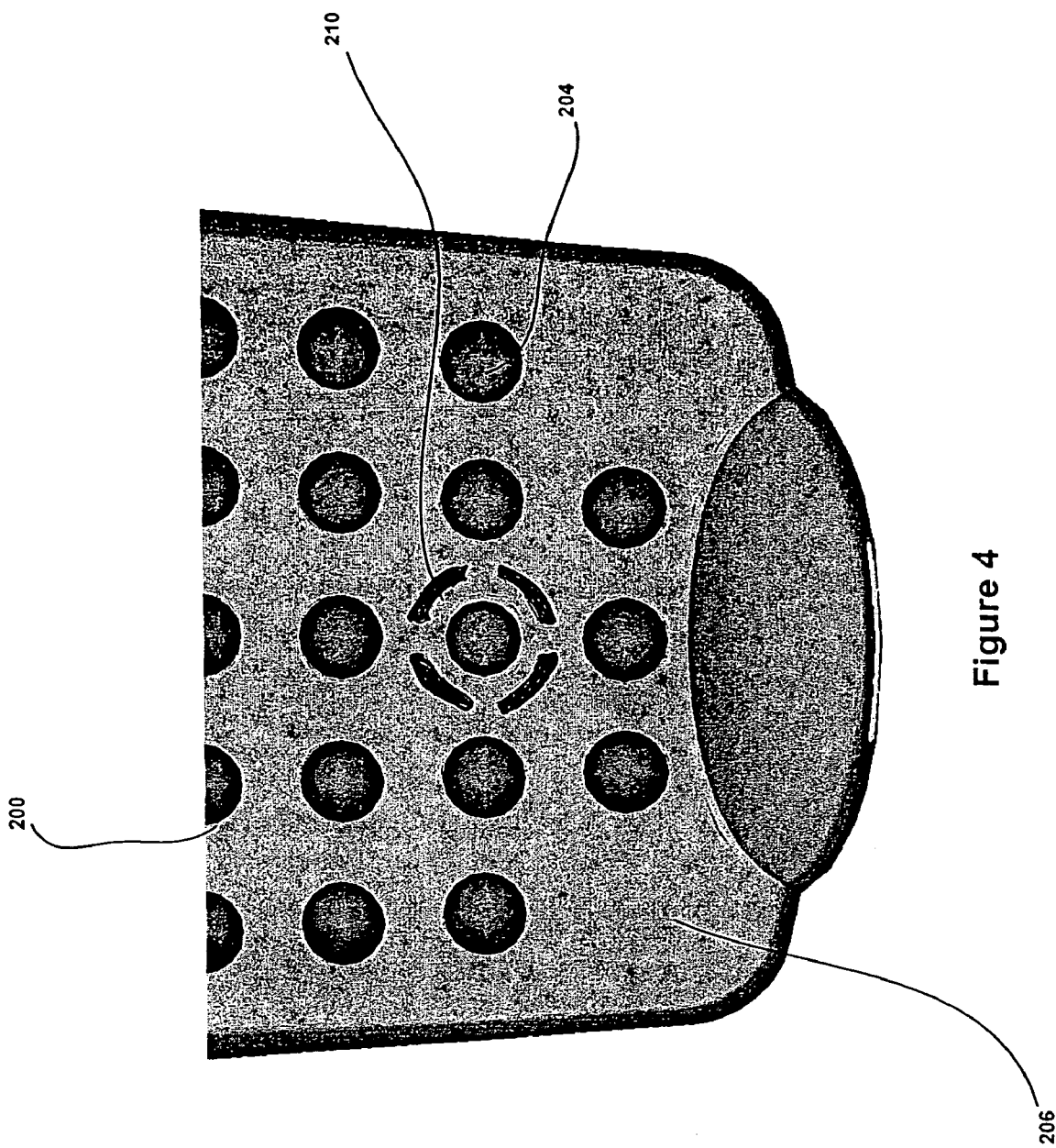
FIG. 4 is a top view of the keyboard module shown in FIG. 3.

FIGS. 3 and 4 show an additional embodiment of a keypad assembly 200 having a combined bezel substrate and printed circuit board 202 and keys 204 similar to the keys described above, with reference to FIG. 2. In addition, a top housing 206 covers the upper part of the substrate 202. In this embodiment, a speaker 208 is located under the keypad assembly 200. The speaker 208 may be conventional or a piezoelectric speaker, and may be recessed in a locally thinned region of the substrate 202, as described above. Audio ports 210 may be formed through the substrate 202 and the top housing 206, to provide an open pathway for the sound generated by the speaker 208. The audio ports 210 may be covered by a mesh to prevent foreign materials from entering the keypad assembly 200. FIG. 4 shows a top view of the keypad assembly 200, indicating an exemplary location and size of the audio ports 210.

Figure 5:
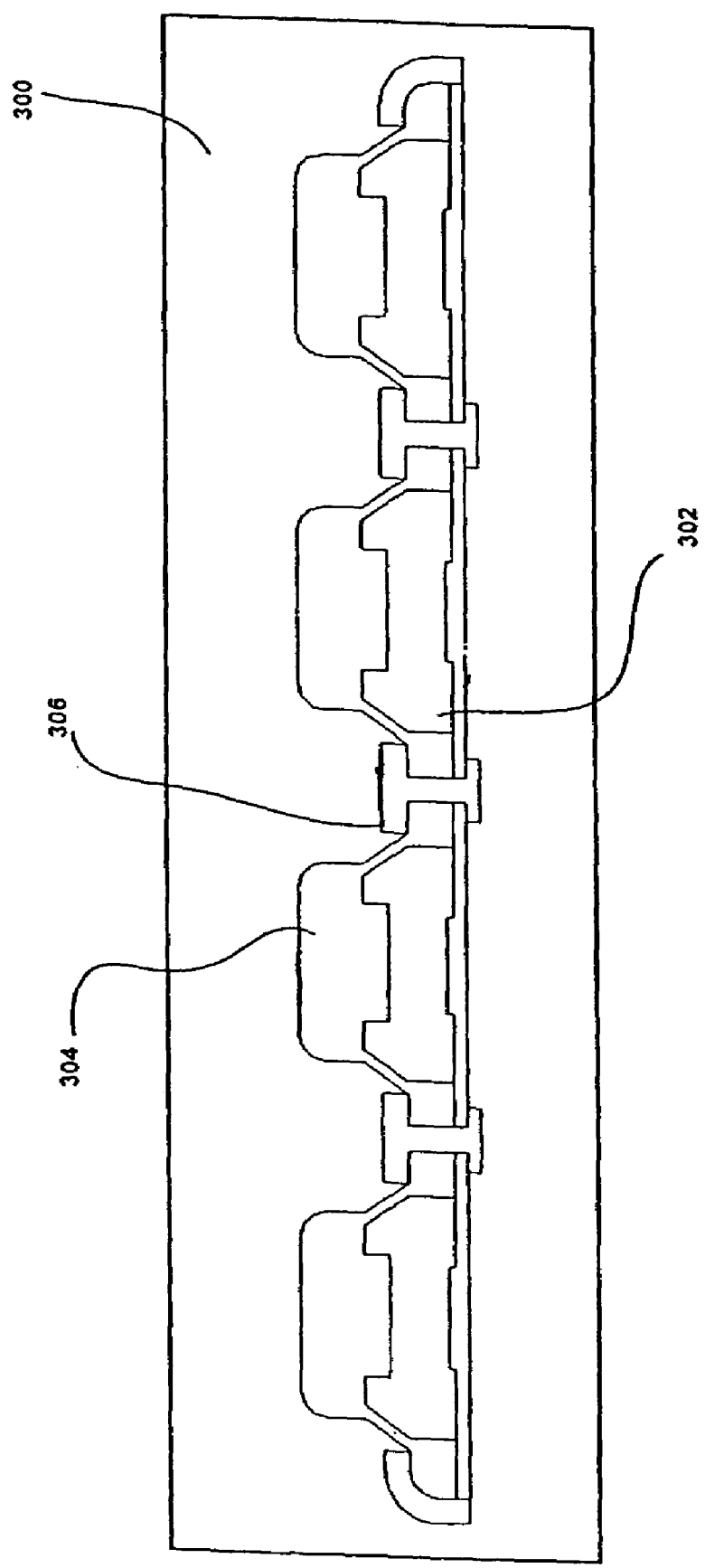
FIG. 5 is a cross sectional view of another embodiment of a keypad module according to the present invention.

FIG. 5 shows a different exemplary embodiment according to the present invention. A keypad module 300 includes an electronics layer 302 that supports a printed circuit board and a keypad 304 similar to the one described with reference to FIG. 2. In this embodiment, the structural support is formed by an over-molded bezel 306, that may define the shape and size of the keypad module 300. According to this embodiment, the over-molded bezel 306 is molded over the keypad 304 and the layer 302, so that it adheres to both components, and seals them into a unitary assembly.

Figure 6:
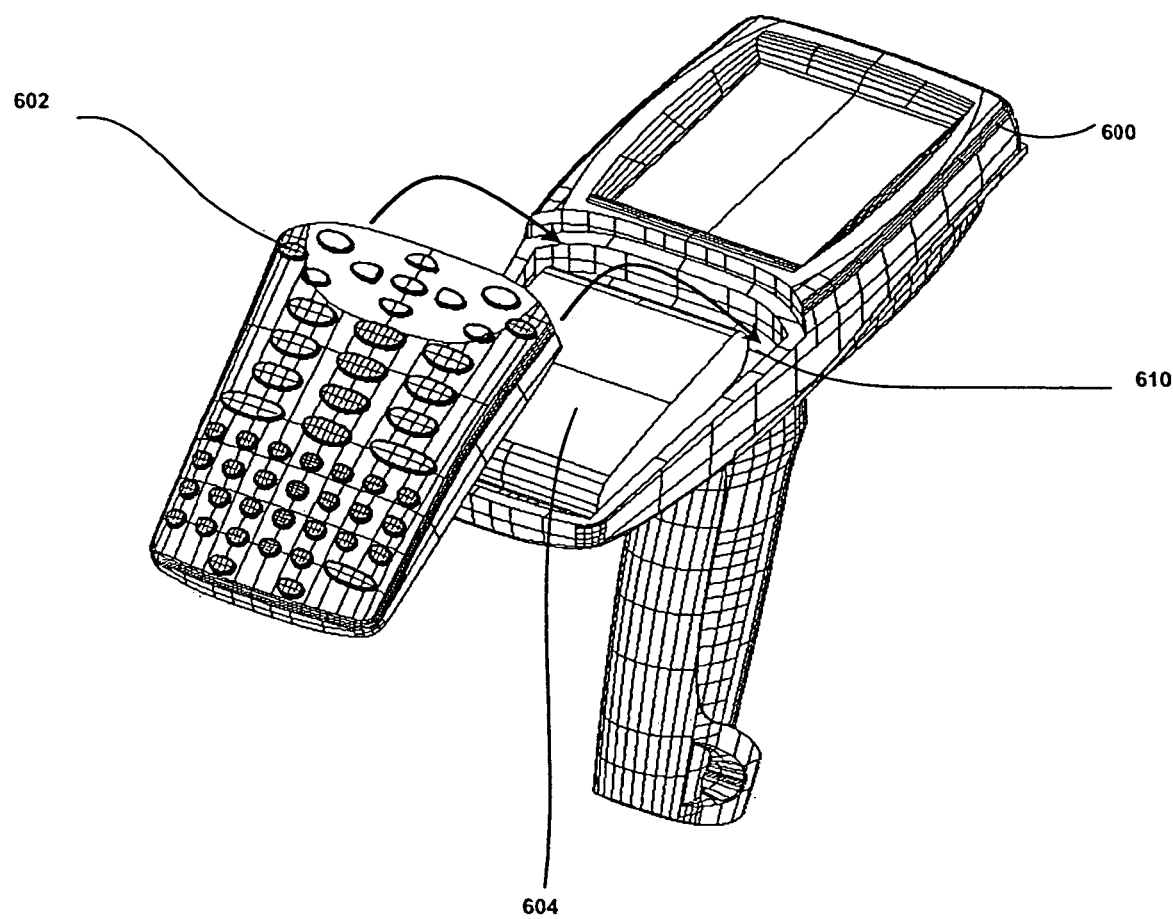
FIG. 6 is a perspective view of a keypad module according to another embodiment of the present invention, showing the module conforming to a battery module of an exemplary device.

In a different embodiment, the keypad module may be used as a door for the compartment containing the batteries powering the device. In an exemplary embodiment shown in FIGS. 6 and 7, a product 600 may be designed to accept a keypad module 602 that doubles as a cover or door for a battery compartment 610. Batteries 604 maybe inserted in battery compartment 610, and keypad module 602 may fit above the batteries 604 to close the device. Keypad module 602 may include a sculptured lower surface 608 that is shaped to conform to the shape of the batteries 604 placed in compartment 610. In this manner, the batteries may be kept from moving in the device, and the outside dimensions of the product 600 may be kept to a minimum.

The present invention has been described with reference to specific exemplary embodiments, however it is understood that those skilled in the art will be able to devise additional embodiments. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A keypad comprising:
    a common keypad connection interface generic to a plurality of handheld terminals; and
    an identification element that identifies a configuration of the keypad to a handheld terminal attachable thereto.

2. The keypad of claim 1 the handheld terminal with a software up-loadable based on an identified configuration of the keypad.

3. The keypad of claim 1 the common keypad connection interface includes a tab connector.

4. The keypad of claim 1 the common keypad connection interface is a friction based connector.

5. The keypad of claim 1 further comprising a plurality of electrical components sealed to form the keypad as a modular unit.

6. A method of connecting a keypad to a handheld terminal comprising: attaching a keypad with a common connection interface generic to a plurality of handheld terminals to a handheld terminal; and
    identifying the keypad to the handheld terminal via an identification element associated with the keypad.

7. The method of claim 6 further comprising configuring the handheld terminal based on the identifying act.

8. The method of claim 7 further comprising uploading a software in a processor of the handheld terminal, to designate a configuration thereof.

9. The method of claim 6 further comprising maintaining a position of the keypad on the handheld terminal by the common connection interface via at least one of a friction mechanism and a tab connection.

10. A method of assembling a handheld terminal with a keypad comprising:
    receiving a keypad with a common interface generic to a plurality of handheld terminals by a handheld terminal; and
    automatically self configuring the handheld terminal to perform functions, based in part on the receiving act.

11. The method of claim 10 further comprising replacing the keypad with another keypad, to configure the handheld terminal to perform other functions.

12. The method of claim 10 further comprising redesigning the keypad independent of redesigning the plurality of handheld terminals.

13. A keypad assembly comprising:
    means for connecting a keypad to a handheld terminal; and
    means for identifying the keypad to the handheld terminal.

14. The keypad assembly of claim 13 further comprising:
    means for automatically configuring the handheld terminal based on the keypad attached thereto.

* * * * *